United States Patent
Mouge et al.

(10) Patent No.: US 6,845,936 B1
(45) Date of Patent: Jan. 25, 2005

(54) STABLE HELI-BORNE VECTOR PLATFORM FOR PERFORMING GEOPHYSICAL MEASUREMENTS

(75) Inventors: Pascal Mouge, Longueuil (CA); Emmanuel Chalifoux, Ste-Julie (CA)

(73) Assignee: Geophysique G.P.R. International Inc., Longueuil (CA)

(*) Notice: Subject to any disclaimer, the term of this patent is extended or adjusted under 35 U.S.C. 154(b) by 0 days.

(21) Appl. No.: 10/895,360

(22) Filed: Jul. 21, 2004

(51) Int. Cl.⁷ .......................... G01V 3/16; G01V 3/165; G01V 3/40
(52) U.S. Cl. .................. 244/1 TD; 324/331; 324/323
(58) Field of Search ................. 244/137.4, 1 TD; 324/331, 326, 345, 330, 327; G01V 3/16, 3/165, 3/40

(56) References Cited

U.S. PATENT DOCUMENTS

| | | | | |
|---|---|---|---|---|
| 3,490,032 A | * | 1/1970 | Zurflueh | 324/345 |
| 3,538,428 A | * | 11/1970 | Barringer | 324/330 |
| 3,872,375 A | * | 3/1975 | Ronka | 324/330 |
| 3,875,497 A | * | 4/1975 | Madsen | 324/326 |
| 4,628,266 A | * | 12/1986 | Dzwinel | 324/330 |
| 4,641,100 A | * | 2/1987 | Dzwinel | 324/330 |
| 6,244,534 B1 | * | 6/2001 | Klinkert | 244/1 TD |
| 6,255,825 B1 | * | 7/2001 | Seigel et al. | 324/331 |

FOREIGN PATENT DOCUMENTS

| | | | | |
|---|---|---|---|---|
| CA | 2187952 | * | 10/1996 | G01V/3/16 |
| CA | 2232105 | * | 3/1998 | G01V/3/16 |

* cited by examiner

Primary Examiner—Teri P. Luu
Assistant Examiner—Stephen A Holzen
(74) Attorney, Agent, or Firm—Ogilvy Renault; Guy J. Houle

(57) ABSTRACT

A stable heli-borne vector platform capable of accepting a range of different sensors or instruments, particularly, but not exclusively, for the mapping and exploration of mountainous regions is described. The platform enables the arrangement of the sensors in three orthogonal directions, thus allowing the restitution of the resultant vector. The geographical referencing is provided by the use of a differential GPS receiver, whose antenna is installed on the main body of the platform. This platform distinguishes itself from its predecessors through the use of a lateral pulling axis, the use of a heavy weight placed underneath the main body, and by a perfectly symmetrical geometry in the direction of pull, thus ensuring perfect in-flight balance and stability.

16 Claims, 3 Drawing Sheets

STABLE HELI-BORNE VECTOR PLATFORM FOR PERFORMING GEOPHYSICAL MEASUREMENTS

TECHNICAL FIELD

The present invention relates to a stable heli-borne vector platform for performing geophysical measurements over a surface area.

BACKGROUND ART

Airborne geophysical measurements depend on the use of a stable platform that is precisely located geographically, able to incorporate sensors aligned in three orthogonal directions, and able to follow the topography closely, without any disturbance, especially from the towing craft.

Therefore, the platform needs to be situated at a sufficient distance from the towing craft so as to be free of its field of influence. It needs to be stable, in the sense that any pitch, roll or yaw movements are minimized so that the wanted signal is not affected significantly. Such measurements are most commonly taken using fixed-wing aircraft, but these craft do not fully satisfy the criteria of separation from the platform, or that of being able to closely follow the topography. The helicopter, on the other hand, is able to fully satisfy these two criteria.

Most geophysical methods require differential measurements, in other words, they record components of the signal through the use of suitably distanced sensors capable of measuring the rate of change of the signal. When this rate of change is measured in three orthogonal directions, these measurements can be used to calculate the resultant vector, called the total gradient. In general, this value contains more information than the actual field value, mostly because it allows one to remove uncertainties due to approximations, for example those due to the distance of the base station from the sensors in the case of magnetic measurements.

Magnetic gradiometer measurements are one of the possible applications of the platform presented here. It is the method most suitable for describing the principals used, and is hence used to illustrate the advantages of the present platform.

The first trials to produce such a system began in the 1960's for magnetic field measurements. References are herein provided to map some history of airborne magnetic gradiometry measuring systems.

Papers by Hood, P. J., 1965 (Gradient Measurements in Aeromagnetic Surveying; Geophysics, Vol. 30, p. 891–902) and Hood, P. J. and Teskey, D. J., 1989 (Aeromagnetic Gradiometer Program of the Geological Society of Canada, Geophysics, Vol. 54, p. 1012–1022), describe existing systems through a retrospective examination. Papers by Hood, P. J. and Teskey, D. J. 1987 (Helicopter-borne Aeromagnetic Gradiometer Surveys: A Progress Report, in Current Research, Part A. Geol. Surv. Can., Paper 87-1A, p. 935–938), show the advantages of differential measurements for mineral prospecting.

Thus, in 1984 at least four systems were known to exist for this activity. All of them were built based on the same model, as presented in FIG. 2 of the paper by Hood, P. J. and Teskey, D. J., 1987 (Helicopter-borne Aeromagnetic Gradiometer Surveys: A Progress Report, in Current Research, Part A. Geol. Surv. Can., Paper 87-1A, p. 935–938), that of a "bird" at the end of a tow-cable (towed bird), above which a vertical mast around 2 meters in length is usually attached.

To summarize, the principal characteristics of this model comprise one main longitudinal axis; a secondary vertical axis placed above the main axis, and a pulling point located above the group formed by these two axes.

The various models proposed subsequently are in fact simply variants of the model described above, since they all use a main longitudinal axis—the bird—above or below which a vertical axis is attached. The two most commonly described models were initially proposed by Gamey, J. T., Holladay, J. S. and Mahler, R., 1997 (Airborne Measured Analytic Signal for UXO Detection, Environmental and Engineering Geophysical Society (EEGS), SAGEEP proceedings, from 853 and onwards), and by Berger, Z., Davies, J., Thompson, R. T., McConnell, T. J., Lo B., Ryder-Turner, A. and MacKay, P., 1999 (Exploration Applications of Three Dimensional Gradient Magnetics in the Western Canada Sedimentary Basin and the Fold Best Region, Reservoir, September 1999), and finally by Siegel, H. O., McConnell, T. J. and Ryder-Turner, A., 2001 (Method and Apparatus for Detecting Locating and Resolving Buried Pipelines, Cased Wells and Other Ferrous Objects, U.S. Pat. No. 6,255,825 B1, Date of Patent Jul. 3, 2001).

The last publication above claims both a methodology and a system for the detection and positioning of ferrous magnetic objects. The claimed methodology is based on the use of the "analytical signal", as is commonly known through the work of Nabighian, published in 1972 (Nabighian, M. N., 1972, The Analytic Signal of Two-dimensional Magnetic Bodies With Polygonal Cross-Section: Its Properties and Use for Automated Anomaly Interpretation: Geophysics, Vol. 37 (3), p. 507–517) and more recently by Roest, W. R., Verhoef, J., and Pilkington, M., in 1992 (Roest, W. R., Verhoef, J., Pilkington, M., 1992, Magnetic Interpretation Using the 3-D Analytic Signal: Geophysics, Vol. 57 (1), p. 116–125). Its application for ferrous magnetic object detection has been previously presented by Gamey, J. T., Holladay, J. S. and Mahler, R. in 1997 (Airborne Measured Analytic Signal for UXO Detection, Environmental and Engineering Geophysical Society (EEGS)., SAGEEP proceedings, from 853 and onwards).

The system described in the paper by Siegel, H. O., McConnell, T. J. and Ryder-Turner, A., 2001 makes use of the three main characteristics as originally published by Hood, P. J. and Teskey, D. J., 1987 (Helicopter-borne Aeromagnetic Gradiometer surveys: A Progress Report, in Current Research, Part A, Geol. Surv. Can., Paper 87-1A, p. 935–938).

SUMMARY OF INVENTION

It is a feature of the present invention to provide a stable heli-borne vector platform for performing geophysical measurements over a surface area, and is comprised of sensors oriented in three orthogonal directions. To do so, there is provided a horizontal lateral boom, a horizontal longitudinal boom and a vertical boom. The vector platform is stabilized by a weight secured at a lower end of a vertical boom and a drag tail assembly is secured to a rear section of the horizontal longitudinal boom. Instruments are installed at opposite ends of the lateral boom, at the rear of the longitudinal boom, and each end of the vertical boom.

The lateral and vertical booms are disposed in a common plane. The lateral boom has symmetrical boom sections projecting from opposite sides of a central housing disposed on the horizontal longitudinal boom. Sensors are secured at opposite ends of these boom sections and at the top ends of the vertical boom. A stabilizing weight is secured at the lower end of the transverse vertical boom. A drag tail assembly is secured to the rear section of the horizontal longitudinal boom. Electronic components are placed in the central housing for receiving data from the instruments. An attachment point is provided on each of the lateral boom sections for attachment of a traction means thereto and securable to a tow cable, attached to the helicopter.

BRIEF DESCRIPTION OF DRAWINGS

A preferred lay-out of the present invention will now be described with reference to the accompanying drawings in which.

DESCRIPTION OF PREFERRED EMBODIMENTS

Figure 1:
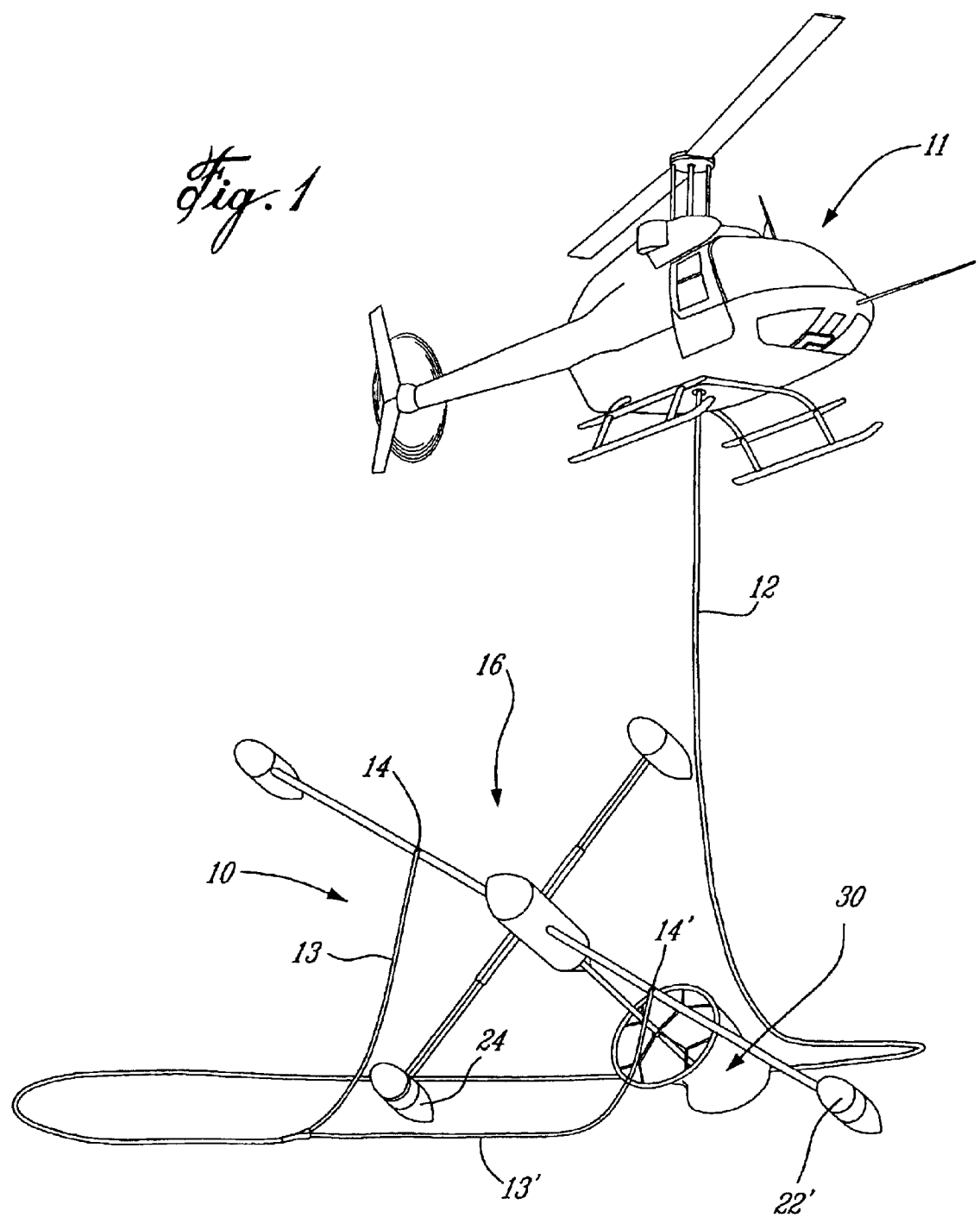
FIG. 1 is a perspective view showing the stable vector platform secured to a helicopter and with the platform disposed at a ground resting position.

Referring now to the drawings and more particularly to FIG. 1, there is shown generally at 10, the stable heli-borne vector platform of the present invention which is secured to a helicopter 11 by a tow cable 12 which is attached to traction means in the form of a pair of identical sling arms 13 and 13' which are respectively secured to tow attachment points 14 and 14' secured to the vector platform 10.

Figure 5:
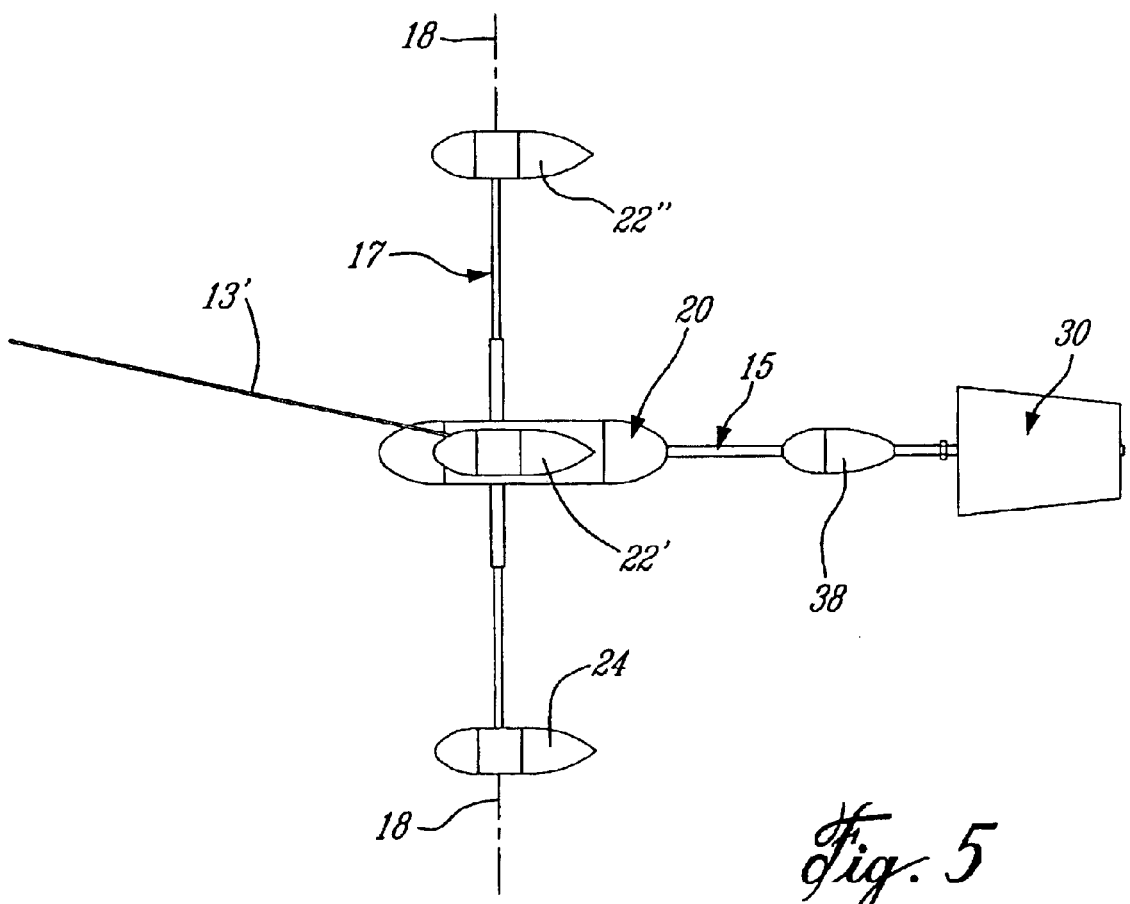
FIG. 5 is a side view of the vector platform illustrated in FIG. 3.

With additional reference to FIGS. 2 to 5, there will be described the detailed construction of the vector platform 10. As shown in these Figures, the vector platform is comprised of a horizontal longitudinal boom 15, a transverse lateral boom 16 and a vertical boom 17. The lateral boom 16 is disposed in a common plane 18 with the vertical boom 17, as illustrated in FIG. 5.

Figure 2:
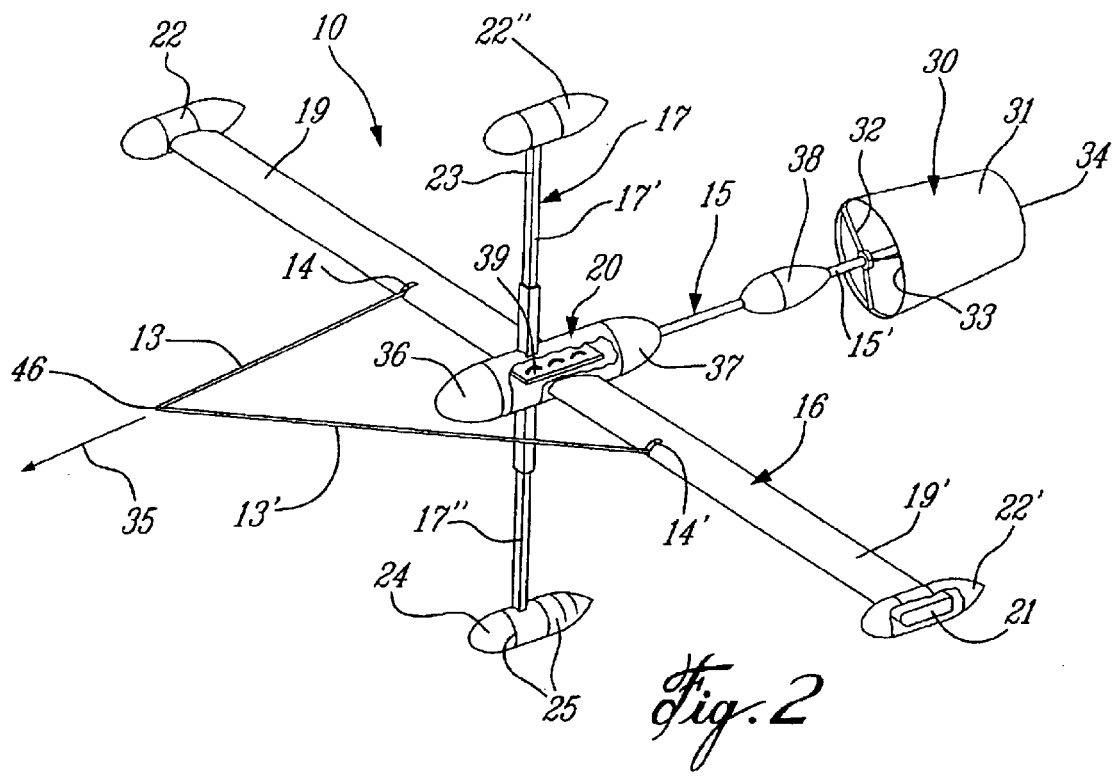
FIG. 2 is a perspective view, partly fragmented, showing the stable heli-borne vector platform in its towing position with the lateral pulling boom being constituted by a rigid wing boom.

The horizontal lateral boom 16 has symmetrical boom sections 19 and 19' which project from opposite sides of a central housing 20 which is disposed on the horizontal longitudinal boom. The lateral boom sections are identical, and are connected to the central housing 20, which constitutes the attachment hub for all the boom sections. These lateral boom sections 19 and 19' are illustrated in FIG. 2 as being rigid elements shaped as a wing profile, the shape of which does not provide lift to the vector platform during normal airborne flying conditions but provides rigidity and reduces flexing moments.

The opposite ends of the transverse boom sections 19 and 19' are fitted with different sensors 21 (see FIG. 2) depending on the type of survey being performed by the vector platform. These sensors are herein shown as being magnetic field sensors and these are located in sensor housings (pods) 22 and 22' spaced approximately 6 meters apart. Only one sensor is herein shown for illustration purposes. Further sensors are located in sensor housings 22"+24 secured to the top and bottom ends of the vertical boom 17. For magnetic measurements, a separation of 3 meters between the sensors is desirable.

The vertical boom also has a lower section 17" with a stabilizing weight secured thereto. This stabilizing weight can be removably secured inside the lower sensor housing 24 in the form of metal discs, herein bronze discs 25, placed either side of the vertical boom 17. The number of these discs may vary depending on the required weight for particular wind conditions. This weight keeps the transverse vertical boom aligned vertically and forces the horizontal components to keep a horizontal alignment when towed.

A drag tail assembly 30 is also secured to the end of the main horizontal boom 15. As herein shown, the drag tail assembly 30 is of aerodynamic design and is comprised of a hollow tapered cylinder 31 herein provided by a fabric material which is held on a support framework 32 which is secured to the horizontal longitudinal boom 15. The tapered cylinder 31 tapers from the open front end 33 to the open rear end 34 allowing the passage of air therethrough as the vector platform is dragged by the helicopter such as illustrated in FIG. 5, when in full flight. This tapering of the cylinder 31 creates a resistance which causes the vector platform to orient itself in the direction of pull as indicated by arrow 35 in FIG. 2.

The central housing 20 is a profiled housing having a dome-shaped nose section 36 and a like rear dome section 37, both of which are removably secured for access to the inside of the housing. As herein shown, a further housing 38 is secured to the rear of the horizontal longitudinal boom 15 to house further electronic circuitry or equipment or further sensing devices. Depending on the nature of the measurements, this housing can be moved along the longitudinal boom 15 from the rear of the housing 20 to the end of the boom 15. The vertical boom sections 17' and 17" are also herein shown as being detachably secured to interchange with booms of different lengths depending on the application of the vector platform. They could also be telescopically constructed. The instruments or sensors feed information or data to electronic components 39 housed within the central housing 20. This data may be recorded in that housing or may be transmitted to the towing aircraft via the tow cable for recording in portable devices for later access. It is also conceivable that they could be transmitted to remote receiving stations.

Figure 3:
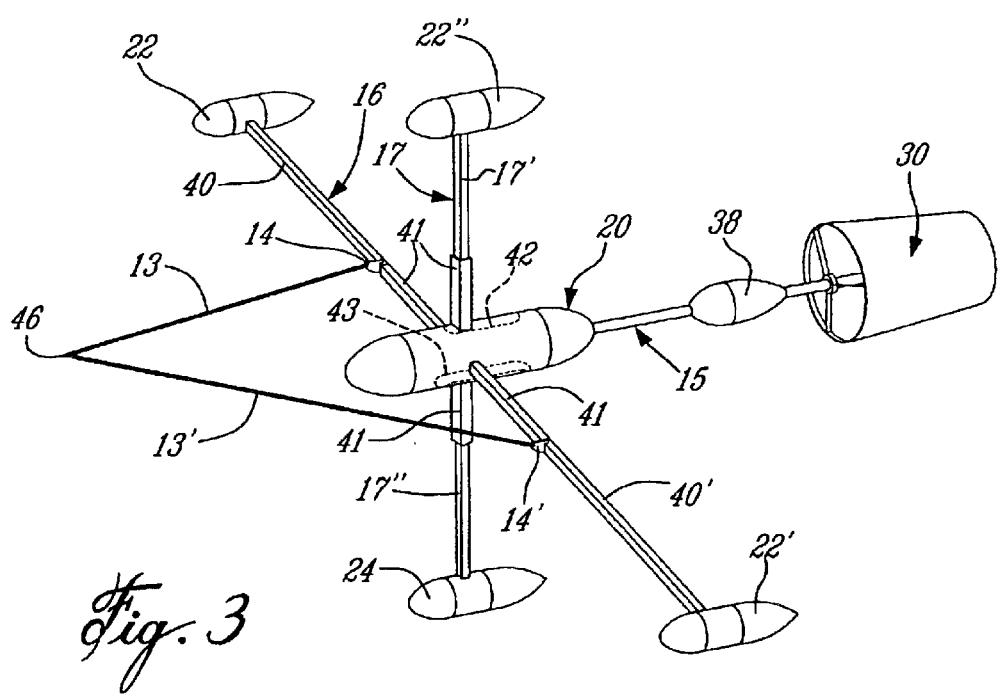
FIG. 3 is a perspective view similar to FIG. 2 but wherein the lateral pulling boom is constituted by rigid rod members.
Figure 4:
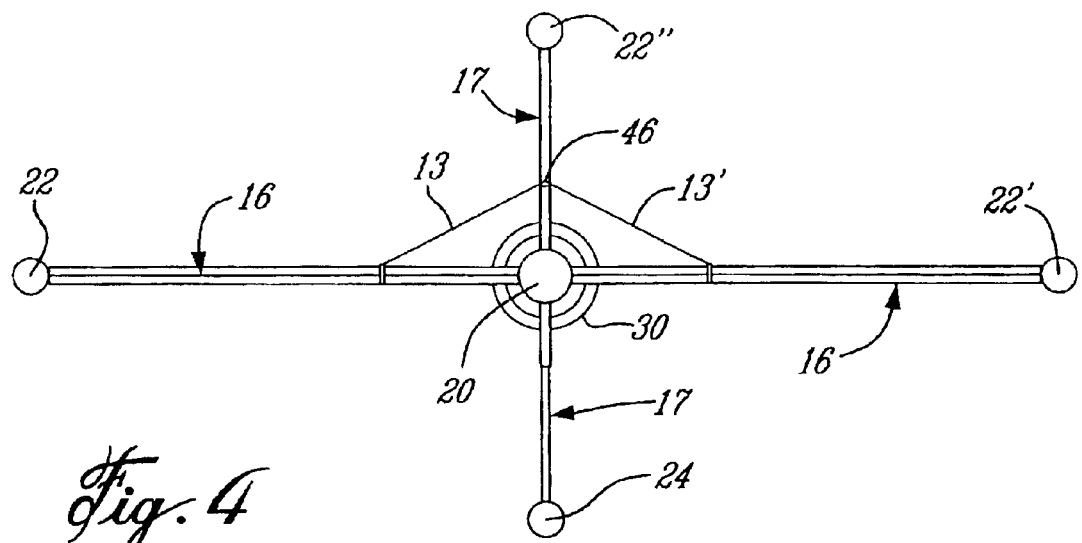
FIG. 4 is a front view of the vector platform showing the symmetry thereof.

As shown in FIG. 3, the lateral pulling boom 16 consists of rigid rod members 40 and 40' of similar construction to the vertical boom rod members 17' and 17". These rod members 40, 40', 17' and 17" may be made up of two sections with the outer sections being removably secured to one of transverse connector tubes 41 secured to the housing 20. These tubes 41 may have holes therein (not shown) and securement pins (also not shown but obvious to a person skilled in the art) to effect an adjustable connection of these rigid rod members whereby to construct a symmetrical boom arrangement, as more clearly illustrated in the front view of FIG. 4. The sections 17' and 17" may also have a wing profile identical to that illustrated in 19 and 19'.

The central housing 20 is also fitted with a DGPS (differential global positioning system) antenna 42 which is secured to the top wall section of the central. An altimeter antenna 43 is similarly secured to the housing 20 at the bottom wall section thereof. Such devices are required to effect airborne geophysical measurements. In order to record variations in pitch, roll, and yaw, a multi-antenna GPS system can be installed.

In order to tow the vector platform in space, there are provided tow attachment points 14 and 14' secured to the opposite symmetrical lateral boom sections 19 and 19' and 40 and 40' at equidistant points from the longitudinal axis. These provide for the attachment of a traction means in the form of a pair of identical sling arms 13 and 13'. These sling arms are constructed of rigid rope material or other suitable material and joined at the forward end 46 where a ring connector may be provided whereby to secure the tow cable 12 thereto, as illustrated in FIG. 1. This tow cable is approximately 30 meters in length, so that the helicopter is maintained at a sufficient distance so as not to interfere with the sensors.

With reference again to FIG. 1, it can be seen that the particular design of the vector platform provides for an apparatus which is easy to land on a ground surface by a helicopter. It is also easy to manually transport. Because of the stabilizing weight 25, the platform will always land with the weight touching the ground surface first and then, as it is gently lowered to the ground, it will articulate sideways and rearwards with one of the sensor housings 22, 22' of the lateral boom 16 also resting on the ground as well as the drag tail assembly 30. As can be seen, the vector platform 10 is stable on the ground and always points upwards in a ready-to-tow position. The helicopter can then land a sufficient distance away from the vector platform.

Briefly summarizing the principal characteristics of the stable heli-borne vector platform 10 of the present invention, it is pointed out that it encompasses a horizontal longitudinal boom 15, a horizontal lateral pulling boom 16 disposed in a common plane with a vertical boom 17 and a stabilizing weight 25 located at the base of the vertical boom acting as a vertical reference. A pulling point 46 is located in front of the vector platform and symmetrically secured to the lateral pulling boom on opposite sides of a central housing 20 which houses various electronic components and which also acts as a mechanical link between the boom members. With this type of symmetrical design the vector platform, when towed, reduces vibrations caused by motion through the air, thus allowing the sensitivity of modern sensors to be fully exploited. When disposed on the ground, the vector platform rests on three points, namely the stabilizing weight, one of the sensor housings of the lateral boom and the drag tail assembly 30, and points upwards in a ready-to-tow position.

It is within the ambit of the present invention to cover any other obvious modifications of the preferred embodiment described herein, provided such modifications fall within the scope of the appended claims.

We claim:

1. A stable heli-borne vector platform for performing geophysical measurements over a surface area, said vector platform comprising a horizontal lateral pulling boom, a horizontal longitudinal boom, and a vertical boom, said vertical boom lying in a common plane with said lateral boom, said lateral pulling boom having symmetrical boom sections projecting from opposite sides of a central housing disposed on said horizontal longitudinal boom, instruments secured at opposite ends of said transverse lateral boom and at opposite ends of said transverse vertical boom, a stabilizing weight secured at a lower end of said transverse vertical boom, a drag tail assembly secured to the rear section of said horizontal longitudinal boom, electronic components installed in said central housing for receiving data from said instruments, and attachment means on said opposite symmetrical boom sections for attachment of a traction means thereto and securable to a tow cable.

2. A stable heli-borne vector platform as claimed in claim 1 wherein said instruments are magnetic field sensors.

3. A stable heli-borne vector platform as claimed in claim 2 wherein sensor housings are secured at said opposite ends of said lateral boom, at said opposite end of said vertical boom and at said rear end of said longitudinal boom for removably securing one or more of said sensors therein.

4. A stable heli-borne vector platform as claimed in claim 3 wherein said opposite symmetrical lateral boom sections are shaped as wing profiles, said wing profile being shaped to provide rigidity and to reduce flexing moments of said vector platform during normal airborne flying conditions.

5. A stable heli-borne vector platform as claimed in claim 3 wherein said opposite symmetrical lateral boom sections and said vertical boom are rigid rod members.

6. A stable heli-borne vector platform as claimed in claim 5 wherein at least some of said rod members are adjustable rod members for adjusting the separation between said sensors.

7. A stable heli-borne vector platform as claimed in claim 4 wherein said transverse vertical boom has top and bottom sections extending from said central housing to said sensor housings at said top and bottom ends thereof, said sections having wing profiles similar to said wing profile of said transverse boom sections.

8. A stable heli-borne vector platform as claimed in claim 2 wherein said stabilizing weight is made up of component parts to adjust the weight thereof to a desired value depending on wind conditions.

9. A stable heli-borne vector platform as claimed in claim 2 wherein said central housing is a profiled cylindrical housing secured at the forward end of said horizontal longitudinal boom.

10. A stable heli-borne vector platform as claimed in claim 9 wherein said central housing is adapted to house one or more additional sensors, said housing further constituting an attachment hub for said boom sections.

11. A stable heli-borne vector platform as claimed in claim 9 wherein a DGPS (Differential Global Positioning System) antenna is secured to the top part of said central housing and an altimeter antenna is secured to the bottom part of said central housing.

12. A stable heli-borne vector platform as claimed in claim 2 wherein said traction means consists of a pair of identical sling arms secured to a common tow ring at one end and to said attachment means on each of the lateral pulling booms at the opposite ends thereby providing perfect towing symmetry.

13. A stable heli-borne vector platform as claimed in claim 12 wherein said tow cable is removably securable to said common tow ring.

14. A stable heli-borne vector platform as claimed in claim 3 wherein said drag tail assembly is comprised of a hollow tapered cylinder concentrically secured about said rear section of said horizontal longitudinal boom to permit the passage of air therethrough from an open front end to an open rear end as said vector platform is dragged by a tow helicopter from the front end of said horizontal longitudinal boom, said front end tapering towards said rear end to create resistance to orient said vector platform in the direction of pull.

15. A stable heli-borne vector platform as claimed in claim 14 wherein said tow cable is approximately 30 meters in length, said vector platform when disposed on a ground surface being angularly oriented with the front end of said horizontal longitudinal boom elevated upwards and supported between said stabilizing weight and one of said sensor housings of said lateral boom and said drag tail assembly.

16. A stable heli-borne vector platform as claimed in claim 3 wherein a further sensor housing is disposed at horizontal longitudinal boom.

* * * * *